Figure 1:
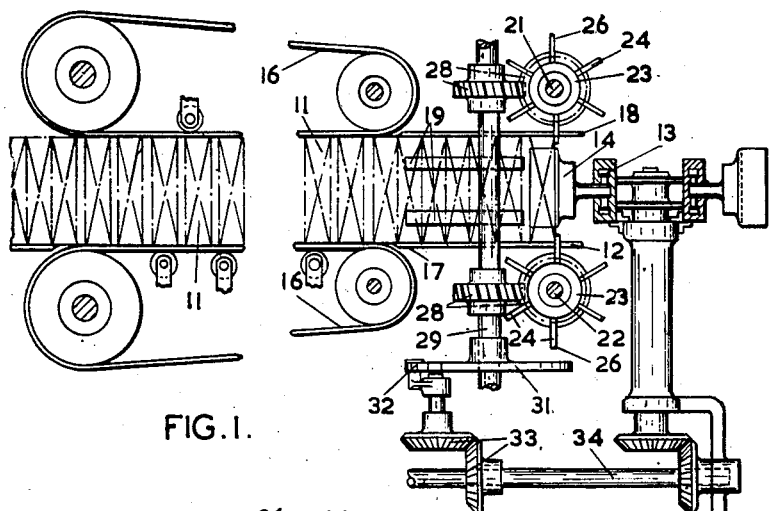

Jan. 14, 1958   J. A. KAY ET AL   2,819,785
ARTICLE CONVEYING AND TRANSFER MECHANISM
Filed Aug. 16, 1955

Inventors
JAMES ARTHUR KAY
ALFRED GERMAN ROSE
By
Semmes & Semmes
Attorneys

United States Patent Office 2,819,785
Patented Jan. 14, 1958

2,819,785
ARTICLE CONVEYING AND TRANSFER MECHANISM

James Arthur Kay and Alfred German Rose, Gainsborough, England, assignors to Rose Brothers (Gainsborough) Limited, Gainsborough, England, a British company Application August 16, 1955, Serial No. 528,788

Claims priority, application Great Britain August 25, 1954

2 Claims. (Cl. 198—31)

This invention relates to the transfer of articles transversely from one conveyor to another conveyor or other support.

According to the present invention, an apparatus for this purpose comprises a pair of opposed movable bladed members adapted to operate synchronously to cause their blades to move simultaneously into engagement with one side of an article during its conveyance by one conveyor so as to move the article transversely away from that conveyor towards another conveyor or other support.

The bladed members are conveniently rotatable and each provided with a plurality of blades, the members being continuously or intermittently rotatable. The blades may be of sufficient width to transfer a batch of articles at one time, thus reducing their rate of operation in relation to the movement of the articles. The bladed members are also conveniently adjustable in height relatively to each other to accommodate articles of different height.

The invention has been found particularly useful in the transfer mechanism of carton-filling and closing machines, and will now be described in greater detail with reference to the accompanying diagrammatic drawings, as applied to such a machine.

Figure 2:
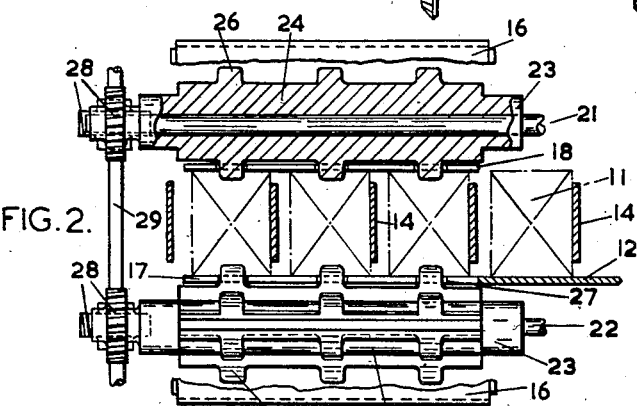
Figure 3:
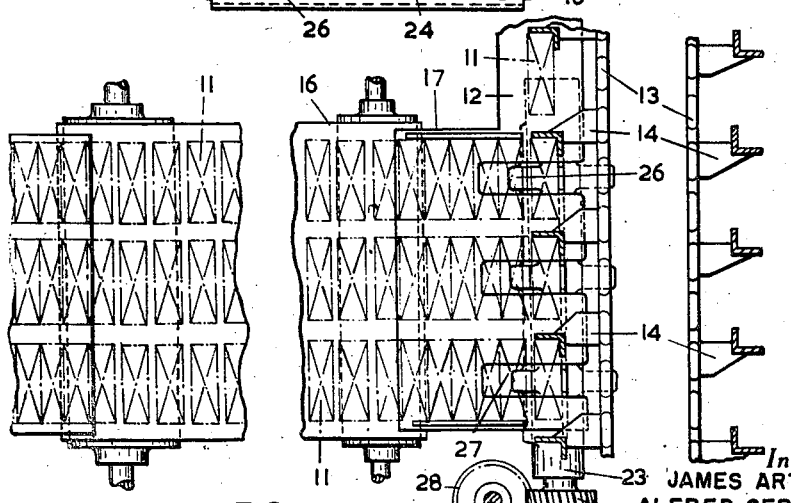

In the drawings:

Figure 1 is an end elevation of part of such a machine, showing the transfer station, Figure 2 is a front elevation of the same part of the machine, and Figure 3 is a plan with part of the upper structure removed.

Filled and closed cartons 11 are transported in spaced succession along a supporting platform 12 by a conveyor chain 13 arranged alongside the platform 12 and provided with spaced pushers 14 extending laterally over the platform 12 from one side. The conveyor 13 moves continuously to forward the cartons 11 towards a "drier" conveyor extending at right angles to the conveyor 13 on the opposite side of the platform 12. The drier conveyor consists of opposed upper and lower endless belts 16 between adjacent laps of which the cartons 11 pass to consolidate the sealing of the upper and lower ends of the cartons. The platform 12 extends laterally opposite the belts 16 to form a support 17 leading to the belts 16, and an upper guide plate 18 is positioned above the extending support 17 to form with the latter a guide channel. Side guides 19 are also provided.

Mounted on shafts 21 and 22 arranged above and below the level of the cartons 11 are a pair of bladed members 23 each having six equally spaced blades 24. The tips of the blades are slotted to form projections 26 which pass through slots 27 in the extending support 17 and the upper guide plate 18 to allow the blades 24 successively to move into engagement with the faces of a batch of cartons 11 being moved along the platform 12 by the pushers 14.

The shafts 21 and 22 are driven by helical gears 28 from a shaft 29 itself driven by a Geneva mechanism 31, 32, the latter mechanism being driven by bevel gearing 33 from a main driving shaft 34. The Geneva mechanism 31, 32 causes the bladed members 23 to rotate through a sixth of a revolution at a time, to cause the successive blades 24 to transfer successive batches of cartons 11 into the guide channel, the batches being moved along the channel into the belts 16 by successive batches.

The upper belt 16 and the upper blade member 23 (with their driving gear) are arranged for vertical adjustment to accommodate cartons of different height.

By suitable timing of the Geneva mechanism, it is found that cartons delivered continuously by the chain conveyor at high speed, e. g., 200 per minute or more, may be successfully transferred by the bladed members without sensible damage and with little danger of jamming.

We claim:

1. In a carton-filling and closing apparatus comprising a conveyor having a horizontal supporting surface, spaced pushing elements located adjacent thereto for forwarding the cartons through the apparatus and delivering them at a transfer station and a pressure conveyor consisting of a pair of spaced bands located transversely of said supporting surface and arranged to move transversely of the path of movement of the delivery conveyor, the combination of a guide channel between the delivery conveyor and the spaced bands for leading the cartons into the space between the bands, with a pair of opposed movable bladed members arranged one on each side of the guide channel and means for driving the bladed members synchronously to cause their blades to move simultaneously through said supporting surface into engagement with opposed marginal portions of one side of a carton during its conveyance by the delivery conveyor so as to move the carton transversely away from that conveyor and into the guide channel by pressure exerted in a parallel plane against those marginal portions, successive cartons then pushing preceding cartons through the channel and into the space between the opposed bands.

2. Apparatus as in claim 1, wherein the bladed members are rotatable and each provided with a plurality of radial blades.

References Cited in the file of this patent
UNITED STATES PATENTS

| Number | Name | Date |
|---|---|---|
| 1,609,802 | Ekstrom et al. | Dec. 7, 1926 |
| 1,854,011 | Yarrow | Apr. 12, 1932 |
| 1,974,032 | Molins | Sept. 18, 1934 |
| 1,997,532 | Molins | Apr. 9, 1935 |